INVENTORS
LEO ROBBINS
JACK BENDROR

INVENTORS
LEO ROBBINS
JACK BENDROR
BY McGlew & Toren
ATTORNEYS

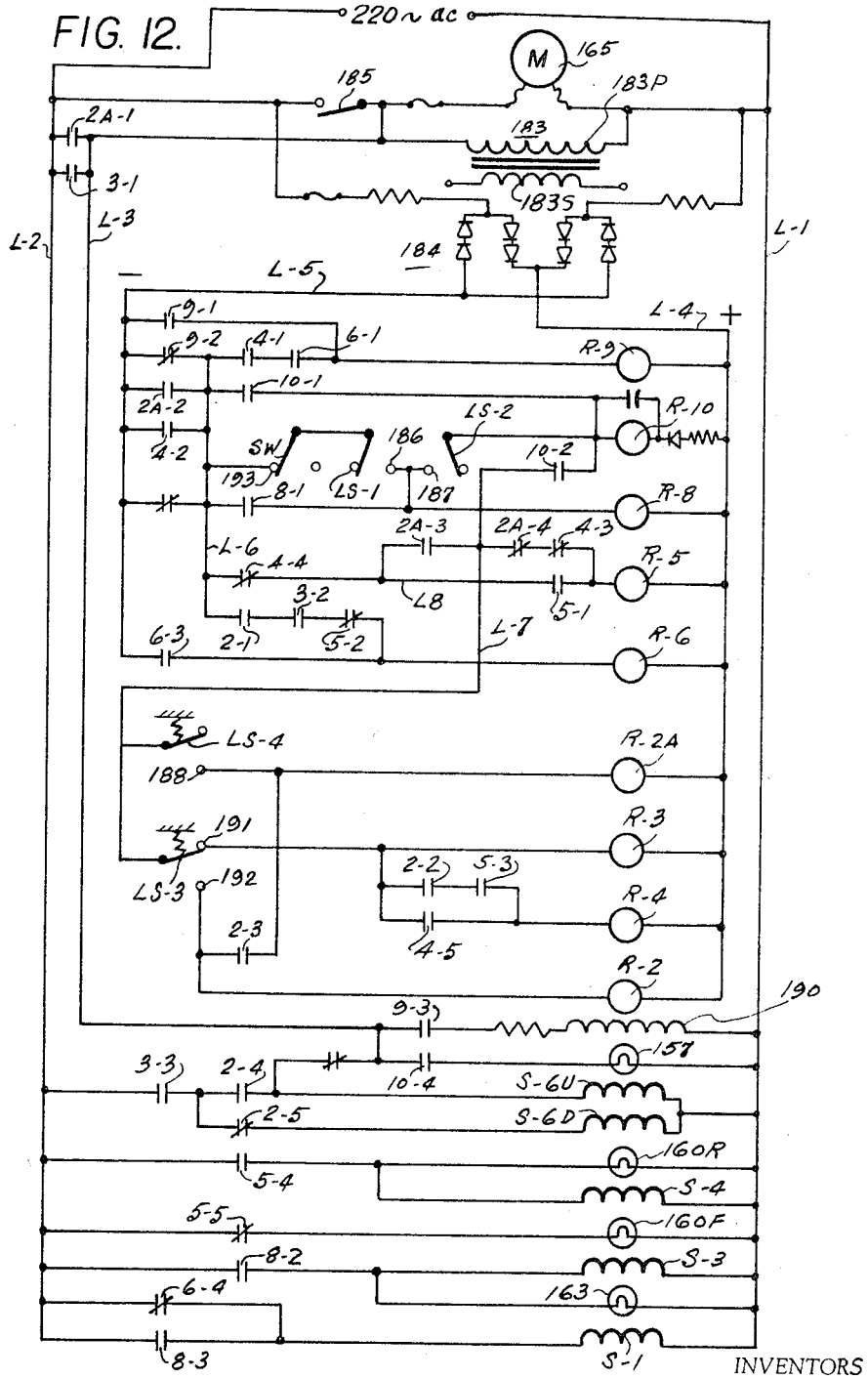

United States Patent Office 3,280,413
Patented Oct. 25, 1966

3,280,413
ROUNDING AND BACKING METHOD
AND APPARATUS
Leo Robbins and Jack Bendror, Brooklyn, N.Y., assignors to Robbins & Bendror Associates, Inc., New York, N.Y.
Filed Jan. 15, 1965, Ser. No. 425,895
25 Claims. (Cl. 11—5)

This invention relates to book binding apparatus and, more particularly, to an improved automatic book rounding and backing machine by means of which the back of a book may be shaped or rounded to arcs of various extent and radii without the necessity of making complicated readjustments and may be evenly supported without interference.

In the art of book binding, the stacked pages of a book are untied, at their rear edges, by sewing and/or gluing. After the pages of the book are thus secured together, the back of the book is rounded to an outwardly convex curvature, and pages or signatures of the book are then backed, which means displaced to form a joint at either edge. Such backing usually is effected by appropriately clamping the back end of the book and a backing roller or backing iron is oscillated over the back of the book to obtain the desired displacement, the book being held in firm engagement with the backing iron so that the latter can effect the necessary displacement of the book pages to achieve the rounded and backed effect.

In our U.S. Patent No. 2,911,659, issued November 10, 1959, we have shown and described a machine for thus shaping the backs of books. This machine is a self adjusting machine whereby it is possible to feed books of any thickness, at random, to the back mechanism. The machine is satisfactory for many books, but it has been found that some books require a differently shaped back in that the arc of curvature must have a different radius. Taking two books of the same thickness, each of which is to have a rounded back but with the rounding being effected to arcs of two different radii, it is difficult, or at least very time consuming, with known machines, to effect the necessary adjustment and interchange of parts in order to achieve two different degrees of curvature. Furthermore, the support arrangments hitherto used for preliminary positioning of the back of the book for operation thereof by the rounding means have resulted in some difficulties due to irregularities in the backs of books such as caused by knots from the sewing and by lumps of glue.

An object of the present invention is to provide a book rounding and backing machine in which the arc of curvature of the book back may be varied in a simple manner.

Another object of the invention is to provide a book rounding and backing machine in which fast wearing parts, such as dynamically loaded chains and cams, are eliminated.

A further object of the invention is to provide a book rounding and backing machine having novel support means for initial positioning and support of the book prior to the rounding operation.

Still another object of the invention is to provide a book rounding and backing machine having a novel support for the book, whereby interference due to irregularities in the backs of books, such as knots from sewing and lumps of glue, is reduced, if not eliminated.

Still a further object of the invention is to provide a book rounding and backing machine embodying rounding rollers and backing iron or roller means which are adaptable to any thickness of books and effective to provide a wide range of different curvatures.

Yet a further object of the invention is to provide a book rounding and backing machine in which the book, prior to the rounding and backing operation, is supported on a few relatively thin blades spaced sufficiently to accommodate, between the plates, lumps of glue and knots due to the sewing and gluing.

A further object of the invention is to provide a support of the foregoing type which is moved out of the way, for engagement of the book by rounding rollers, and in the same direction as the motion of the book into engagement with the backing roller or iron.

Still another object of the invention is to provide a book rounding and backing machine in which the backing means is normally positioned out of the way of the book, and is not moved into engagement with the book until it starts its backing operation.

An ancillary object of the invention is to provide a book rounding and backing machine involving spaced thin blades for supporting the book and clamping jaw means arranged to engage the book and hold the latter against the backing means, the clamping jaw means being slotted to accommodate the book supporting blades.

An important additional object of the invention is to provide a novel method of supporting a book immediately prior to a back rounding operation.

Yet another important object of the invention is to provide a novel method of backing the back of a book In order to attain the foregoing objects, in accordance with the invention the backing roller or iron is rotatably mounted at the apex of a triangular linkage, and the ends of the base of the triangle formed by the linkage are swingably supported on a pair of pivotally suspended links. The suspension points of these links are adjustable as to the distance or spacing therebetween. When the links are oscillated, the roller, supported at the apex or upper corner of the triangle, will move through a path which is substantially a circular arc. Moving the suspension points of the links closer together decreases the radius and angular extent of the arc, and the radius and angular extent of the arc can be increased by moving the suspension points of the links further apart. Very simple means can be utilized to adjust the distance between the suspension points of the links, and a scale or the like can be associated with the adjusting means so that the arc through which the backing iron or roller moves can be set to any desired curvature within a wide range.

As incorporated in the book back rounding and backing machine, the support means for the backing roller is normally swung to the limit of retraction so that the backing roller is initially out of the path of movement of the book during preliminary positioning and clamping of the latter. The book is then positioned with its bound back supported upon a plurality of spaced relatively thin blades extending transversely of the back edge and having ample space between the blades to accommodate knots and lumps of glue so that the book may be properly supported even when the back is quite irregular, thus substantially improving the quality of the work in rounding and backing the book back. As the book is positioned and clamped in readiness to have its back shaped, the support blades are moved out of the way in the same direction as the motion of the book toward the back rounding position. This eliminates any delay in the rounding operation such as would normally be required until the support for the book is moved out of the way, thus making the operation much faster. After the preliminary positioning on the support, the book is moved or fed by rounding rollers in the direction of the backing iron or roller. There is a definite relation between the amount of feed, the amount of rounding, and the diameter of the rounding rollers.

For an understanding of the principles of the invention, reference is made to the following description of a typical embodiment thereof as illustrated in the accompanying drawings.

In the drawings:

FIG. 12 is a schematic wiring diagram of the apparatus.

GENERAL DESCRIPTION OF MACHINE FRAME

Figure 1:
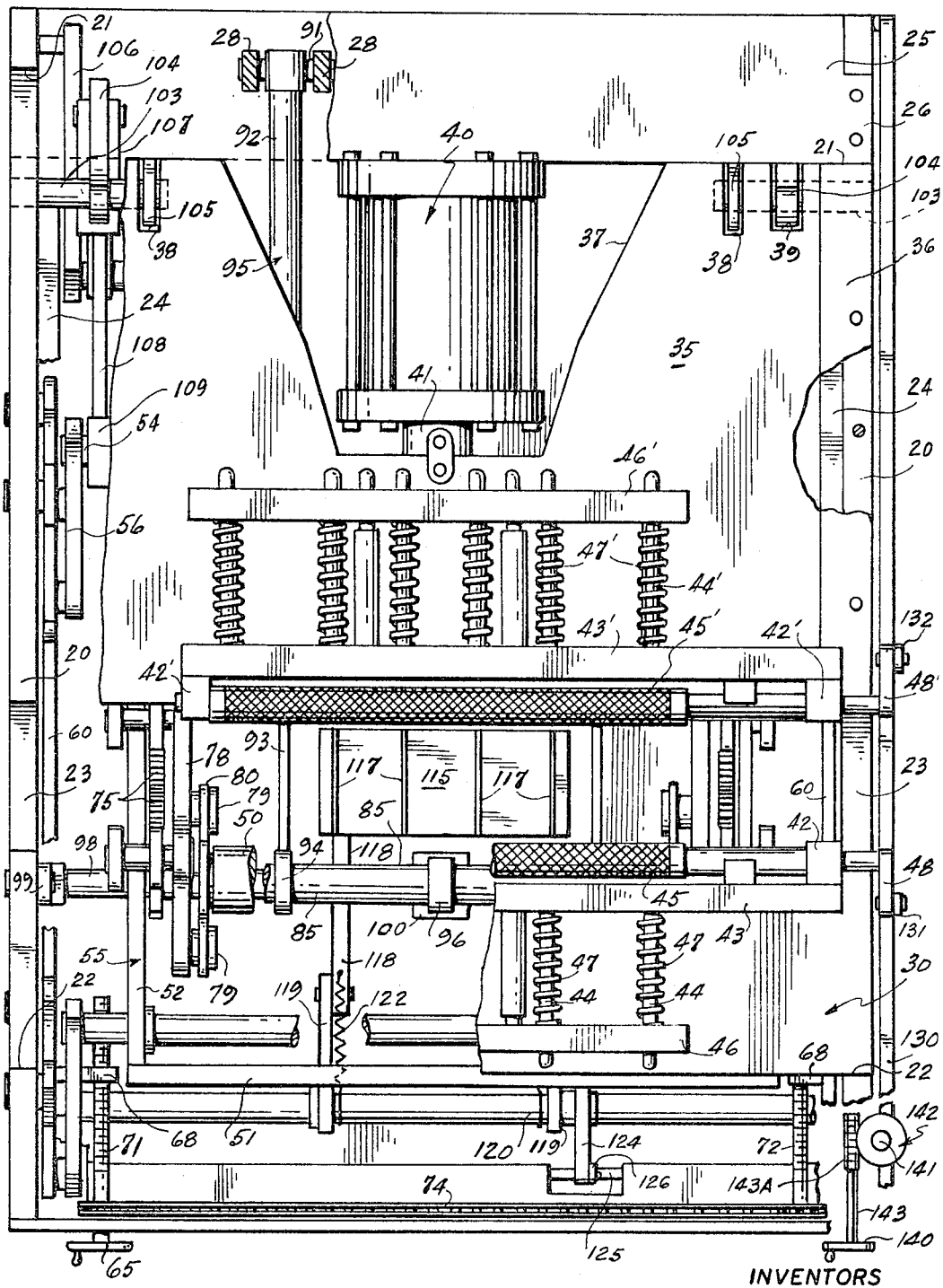
FIG. 1 is a plan view, partly broken away, of book rounding and backing appartus embodying the invention.
Figure 2:
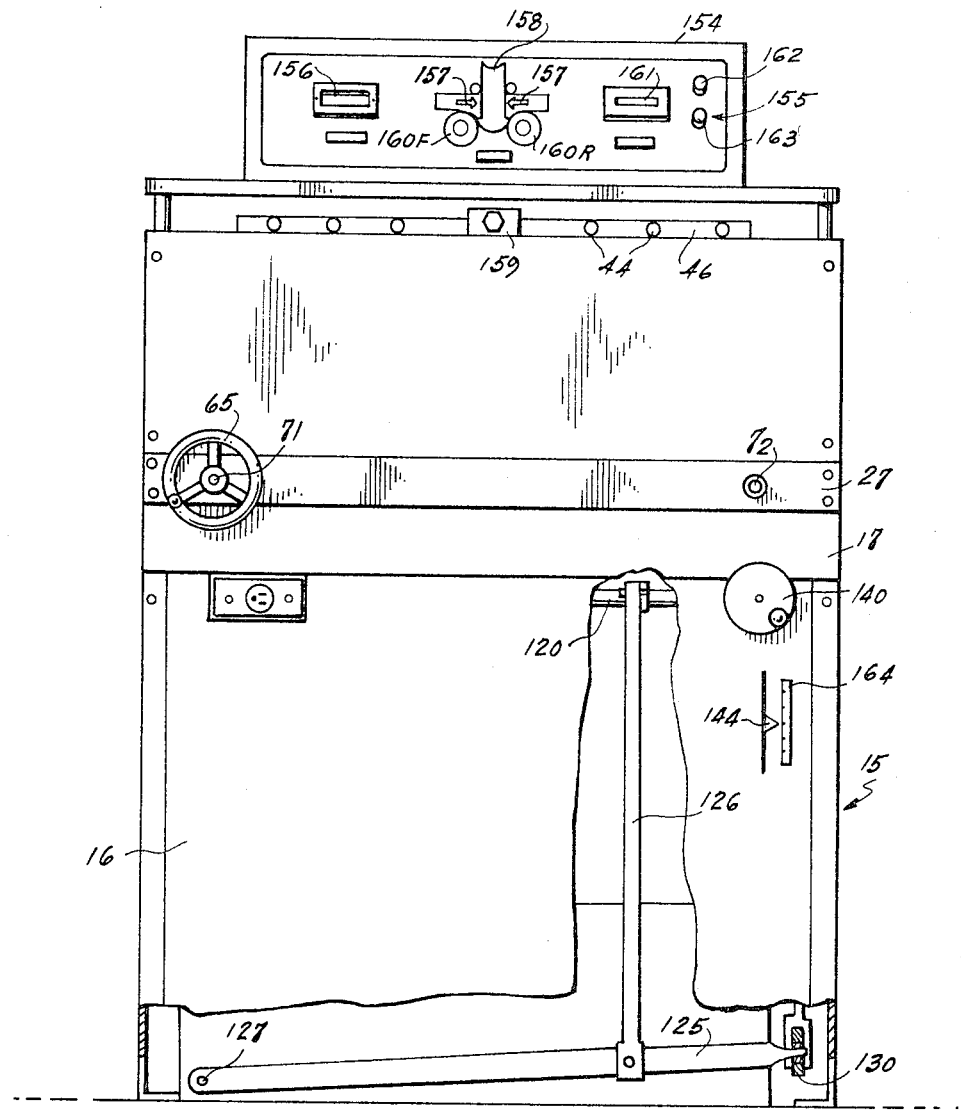
FIG. 2 is a front elevation view of the apparatus, partly broken away.
Figure 3:
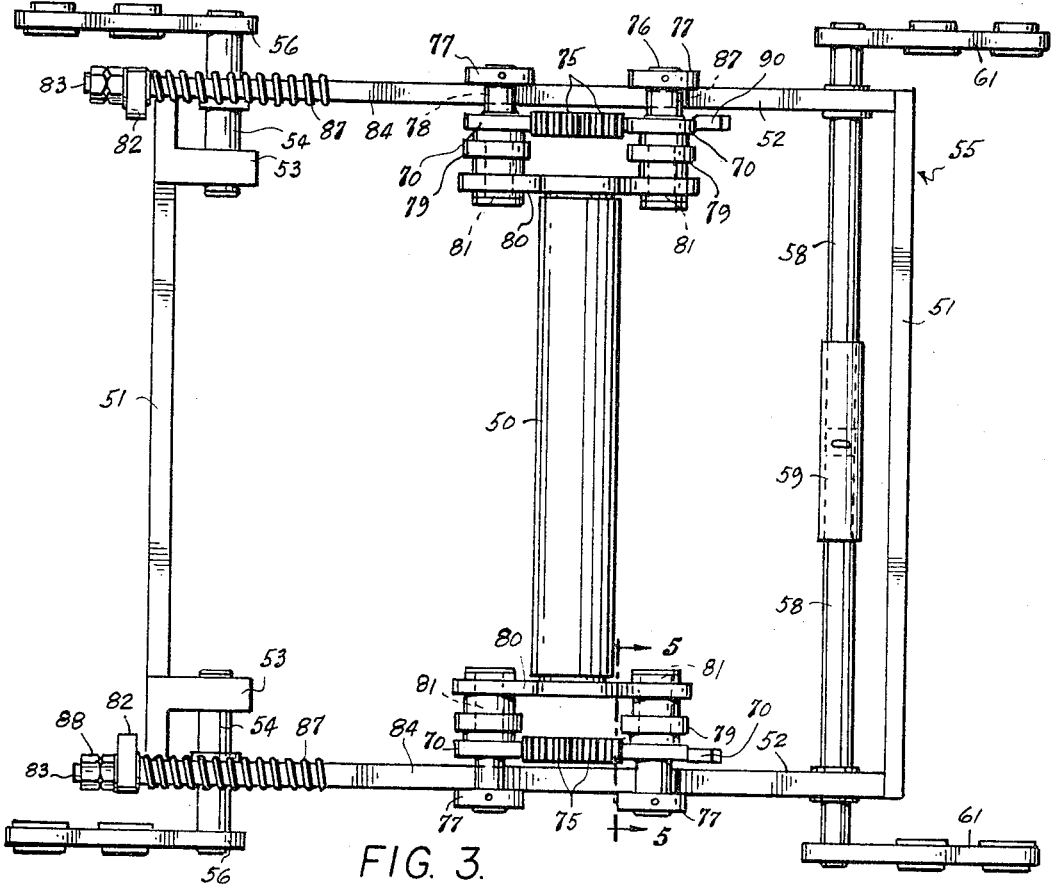
FIG. 3 is a plan view of a carriage for the backing roller.
Figure 4:
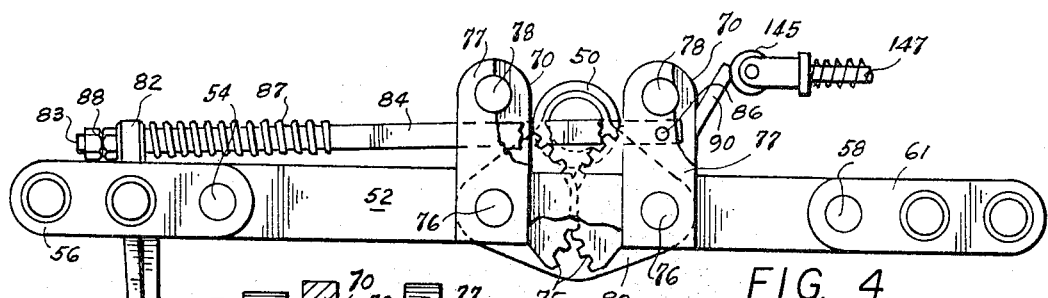
FIG. 4 is a side elevation view of the carriage, partly broken away.
Figure 5:
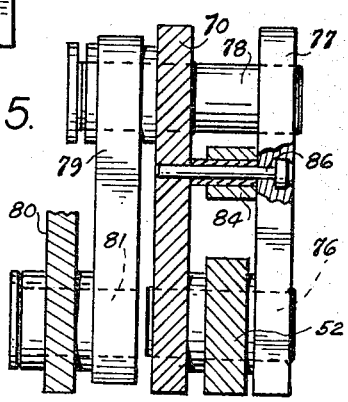
FIG. 5 is a sectional view on the line 5—5 of FIG. 3.
Figure 8:
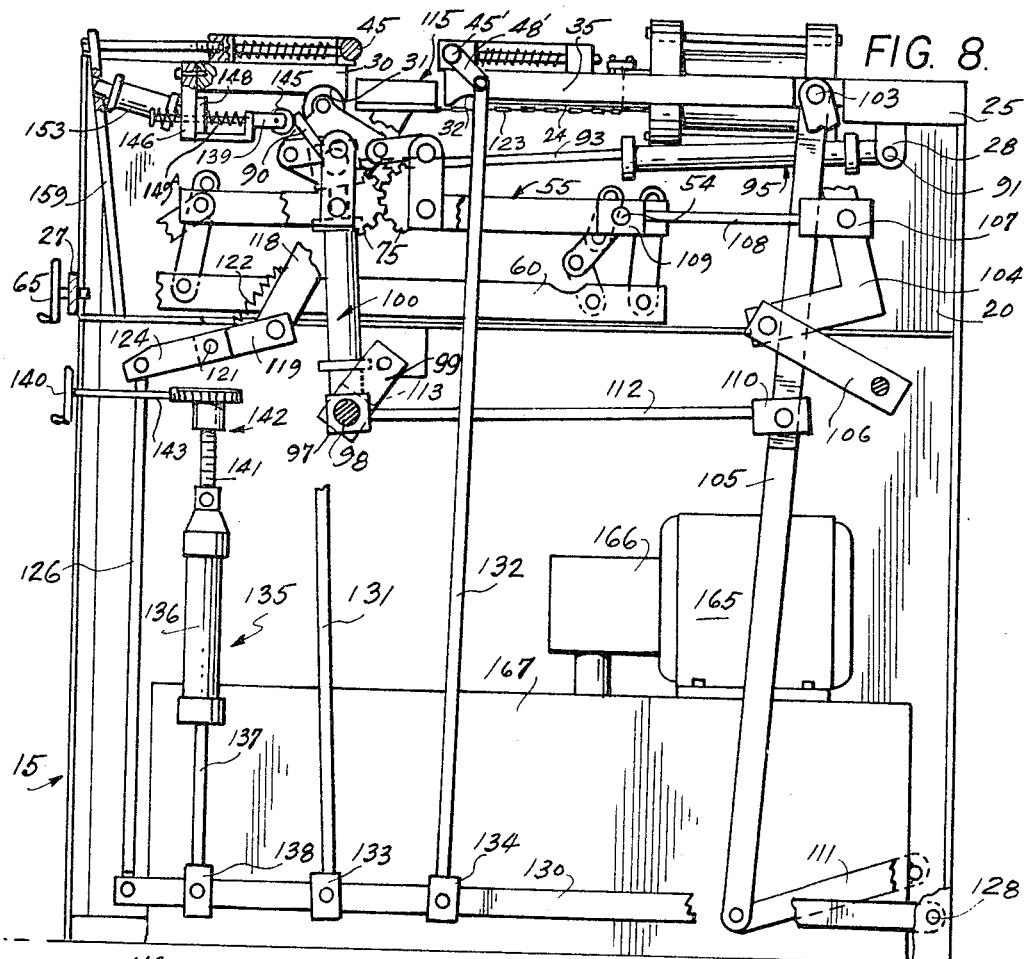
FIG. 8 is an open right side elevation view of the apparatus.

Referring to FIGS. 1, 2 and 8, the machine includes a generally open work support frame 15 formed of structural members, such as angle irons, suitably welded together. In the completed machine, the sides and ends of the open work support frame 15 may be closed by suitable lightweight removable covers 16 as best seen in FIG. 2. The upper flanges of frame 15 serve as supports for side plates 20, which are relatively massive steel plates having a generally rectangular configuration in a vertical plane. Side plates 20 are mating copies of each other.

Adjacent the rear end of the machine, which is the end opposite from the operating end, the horizontal upper edge of each side plate 20 is formed with a substantially rectangular notch 21. Notches 21 receive substantially rectangular extensions 26 on rear beam 25 which extends horizontally between side plates 20 and has its upper surface substantially coplanar with the horizontal upper edges of plates 20. Extensions 26 have outer ends which are substantially flush with the outer surfaces of side plates 20.

Inwardly from their front ends, side beams 20 have their horizontal upper edges formed with relatively shallow and generally elongated substantially rectangular notches 22 wihch are laterally aligned and which open rearwardly into relatively deeper and somewhat shorter substantially rectangular notches 23. Notches 22 seat a front beam or fixed jaw 30, which has its upper surface substantially flush with the horizontal upper edges of side beams 20, and its rear edge substantially flush with the forward vertical edges notches 23. For a purpose to be described, substantially rectangular cross section and relatively elongated rails 24 are secured to the inner surfaces of side beams 20 to extend rearwardly from the rear edges of notches 23 and the upper surfaces of rails 24 lie substantially in the same plane as the bottom surfaces of notches 22. Side beams 20, rear beam 25 and front beam 30 are fixedly bolted together so as to form a rigid frame.

Front beam 30 also constitutes a fixed clamping jaw for clamping of the book during shaping of the back by the backing iron. Beam or jaw 30 is cooperable with a movable rear jaw 35 which is slidably mounted upon rails 24. For this purpose, the upper surfaces of rails 24 may be suitably grooved to receive a lubricant to ease the sliding movement of rear jaw 35. Jaw 35 is maintained in engagement with rails 24 by means of overlying cover plates 36, 36 which are bolted or otherwise secured to the upper edges of side beams 20 and overlie the side edges of rear jaw 35.

As best seen in FIG. 1, movable jaw 35 has a generally trapezoidal central recess 37 in its rear edge, this recess being closed by the front edge of rear beam 25 when movable jaw 35 is fully retracted. A dual acting hydraulic device 40, of the type shown and described in Robbins et al. U.S. Patent 3,068,841, issued December 18, 1962, is positioned in recess 37 and has its base fixedly bolted to the forward edge of rear beam 25 and its smaller diameter hollow piston 41 connected to movable jaw 35. On either side of recess 37, the rear edge of movable jaw 35 is formed with a pair of spaced slots 38 and 39 for a purpose to be described.

For a purpose to be described, front beam 30 has a concave recess 31 extending across its under surface adjacent its rear edge, and a similar concave recess 32 is formed in the under surface of movable jaw 35 adjacent the front edge of the latter. Also for a purpose to be described, the under surface of movable jaw 35 is formed with a series of parallel, very narrow and laterally spaced slots 33 extending rearwardly across concave recess 32.

Both fixed jaw 30 and movable jaw 35 are provided with book clamping and rounding roller assemblies and, as these assemblies are identical in function and subbstantially similar in construction, only the roller assembly for fixed jaw 30 will be described. Corresponding reference characters primed will be applied to the corresponding parts of the book clamping and rounding roller assembly for movable jaw 35.

The roller assembly on fixed jaw 30 comprises a book clamping and rounding roller 45 having a knurled book page engaging cylindrical surface. The smooth cylindrical ends of roller 45 extend rotatably through bearings 42 extending rearwardly from a cross bar 43 which is slidable on the upper surface of fixed jaw or front beam 30. A plurality of guide pins or bolts 44 are secured to cross bar 43 at spaced locations therealong and extend forwardly and perpendicularly to bar 43. Pins 44 extend slidably through aligned apertures in a backing bar 46 which is anchored to the upper surface of fixed jaw 30, and pins 44 are embraced by coil springs 47 which act between bars 43 and 46.

Cross bars 43 and 43′ are slidable over the upper surfaces of jaws 30 and 35, respectively. Suitable means are provided to maintain these cross bars in engagement with the upper surfaces of the associated jaws, and also to restrain outward movement of the bars 43 and 43′ under the influence of springs 47 and 47′, respectively, to a position in which rollers 45 and 45′ normally extend somewhat beyond the operative or clamping edge of the associated jaw. For a purpose to be described, crank arms 48, 48′ are secured to respective corresponding ends of rollers 45 and 45′. The coordination of book clamping and rounding rollers 45, 45′ and jaws 30, 35 will be described more fully hereinafter.

BACKING IRON SUPPORT AND OPERATING MECHANISM

The backing iron 50, which is a metal roller of relatively large diameter, is supported in a carriage 55 (FIGS. 1, 3, 4, 5, 8.) which is a generally rectangular frame. Carriage 55 is, in turn, supported in such a manner that, during movement or adjustment thereof, it always remains parallel to a horizontal plane. Carriage 55 comprises end members 51 and side members 52, which are in the form of metal bars welded to form a rectangle which has a width somewhat less than the distance between side beams 20. Adjacent rear end bar 51, side bars 52 are formed with aligned apertures which are also aligned with apertures in bearings 53 welded to rear end bar 51 and extending forwardly therefrom. The apertures in side bars 52 and in bearings 53 rotatably receive pins 54, each of which has its outer end welted to one end of a respective link 56. Substantially half way between its ends, each link 56 is pivotally connected to a relatively short link 57 which is oscillatably mounted on the adjacent side beam 20.

Adjacent front cross bar 51, side bars 52 are formed with aligned apertures each rotatably receiving one half of a two part shaft 58 whose inner ends are secured in a tubular sleeve 59. The outer end of each cross shaft part 58 is anchored, by means of welding, in an end of a respective link 61. Half way between its ends, each link 61 is pivotally connected to a respective relatively short link 62 whose upper end is pivotally connected to the adjacent side beam 20. Links 57 and 62 are equal in length, as are also links 56 and 61. The arrangement thus far described provides a parallel motion mechanism for carriage 55. The remainder of this parallel motion and adjustment mechanism will now be described.

MEANS FOR ADJUSTING PATH OF MOVEMENT OF CARRIAGE

Figure 6:
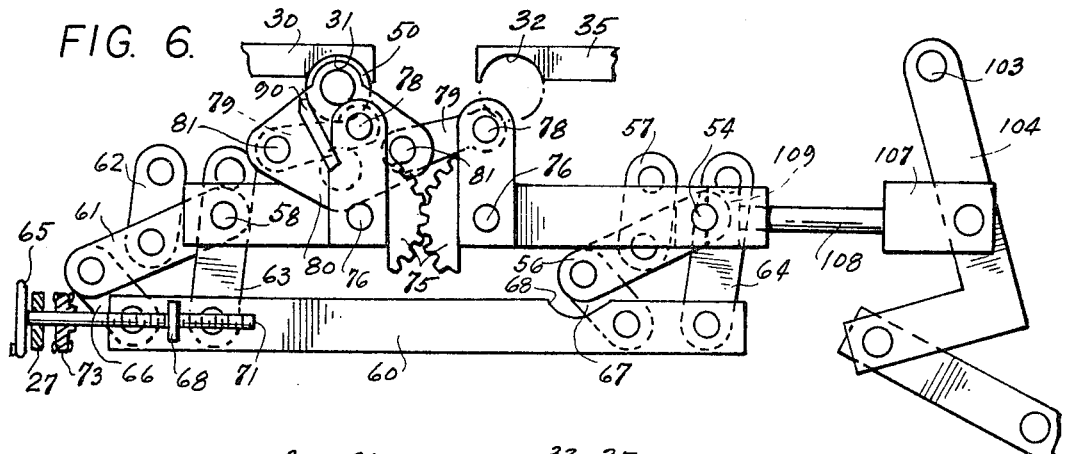
FIGS. 6 and 7 are side elevation views of the carriage and associated elements illustrating two different positions of the parts.
Figure 7:
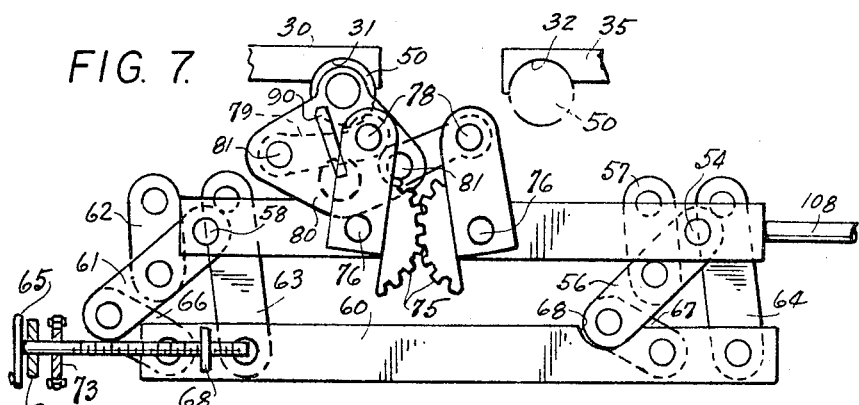

The means for adjusting the path of travel of carriage 55 comprises a pair of relatively elongated metal bars 60 (FIGS. 1, 6 and 7) each of which is suspended from the adjacent side beam 20 by means of a front link 63 and a rear link 64, these links having a length such that bars 60 extend substantially parallel to carriage 55. The bars 60 are thus swingably supported from the adjacent side beams 20. Links 63 are pivotally connected to bars 60 at points spaced rearwardly from the front ends of the latter, and links 64 are pivotally connected to bars 60 adjacent the rear ends of the latter. At fixed and equal distances forwardly of the pivot point of each link 63 and 64, short links 66 and 67, respectively, which are equal in length, are pivotally connected to bars 60, and the opposite ends of links 66 and 67 are pivotally connected to the lower ends of links 61 and 56, respectively. Forwardly of the pivot point of the associated link 67, the upper edge of each bar 60 is formed with a recess 68 for clearance with the lower end of the associated link 56. With the arrangement thus far described, it will be apparent that movement of bar 60 to the right, as viewed in FIGS. 6 and 7, will tend to straighten links 61 and 66 and links 56 and 67, and thus to raise carriage 55 relative to bars 60. A lowering movement occurs upon leftward movement of bars 60. This changes the path of travel of carriage 55 during the clamping operation, as will be described.

The means for effecting such forward and rearward movement of bars 60 will now be described. A cross beam 27 is secured to extend across the forward ends of side beams 20 just above the lower edges of the side beams. A left hand shaft 71 and a right hand shaft 72 are rotatably supported in apertures adjacent the left and right ends respectively of cross beam 27. Each of these shafts has an inner or rearward threaded end which is engaged in a threaded ear 68 on the inner side of the adjacent adjusting bar 60. The left hand shaft 71 is somewhat longer than the right hand shaft 72 so that it projects substantially outwardly from cross beam 27, and an operating hand wheel 65 is secured to the projecting forward end of shaft 71. Sprockets 73 are secured to shafts 71 and 72 just inwardly of cross beam 27, and these sprockets are interconnected for conjoint rotation by an endless roller chain 74. By rotation of hand wheel 65 shafts 71 and 72 are conjointly rotated through sprockets 73 and roller chain 74. The threaded ends of shafts 71 and 72, engaging in threaded ears 68, thus provide for conjoint forward and rearward adjustment of bars 60 and corresponding changes in the elevation of carriage 55.

BACKING IRON SUPPORT LINKAGE

Intermediate its ends, each side bar 52 of carriage 55 has a pair of pins 76, corresponding pins in opposite side bars 52 being coaxial with each other. Each pin pivotally supports an upwardly extending synchronizing link 70, there being two synchronizing links 70 on each side member 52. The two links 70 on each side bar 52 are formed integral with respective gear segments 75 which mesh with each other and which are centered on pins 76. Links 70 are positioned on the inner surfaces of side bars 52 and, on the outer surface of each side bar 52, there is a second link 77 which is identical with the associated link 70 except for the gear segment 75. Pins 78 extend through the paired links 70, 77 at the upper ends thereof and project inwardly of side bars 52 of frame 55.

Four support links 79 are provided, each being suspended from a respective pin 78, each support link 79 being positioned laterally inwardly of a synchronizing link 70. There are thus a pair of support links associated with each side bar 52, and the support links 79 of each respective pair have their lower ends pivotally connected by pins 81 to an essentially rounded corner quadrilateral bracket 80, the two brackets 80 rotatably supporting the backing roller 50. The axis of roller 50 is at the apex of a triangle whose base is represented by a line interconnecting the axes of pins 81.

In a manner to be described, segment gears 75 are rotated in opposite directions, due to their intermeshing engagement, so that pins 78 may be brought closer to each other or further apart. The spacing of pins 78 determines the radius of the arc of swinging movement of the brackets, and thus the radius of the arc of swinging movement of backing iron 50, and this arc may be adjusted over a large range of radii. Directly below backing iron 50 and substantially midway of and somewhat below the base line interconnecting the axes of pins 81, brackets 80 are formed with circular apertures into which a shaft 85 is welded, thus forming a rigid structure.

A pair of abutments 82 are welded to the back end bar 51 of carriage 55, one adjacent each end thereof, and these abutments 82 extend upwardly and rearwardly above the carriage. Abutments 82 are apertured to receive the reduced portions 83 of relatively elongated bars 84. The reduced portion of each bar 84 is slidable through the aperture in the corresponding abutment 82. The forward end of each of the two bars 84 is transversely apertured to receive a cross pin 86 extending between the associated front links 70 and 77. Relatively heavy coil springs 87 embrace the reduced portions 83 of bars 84 and are seated between the forward portion of each bar and the associated abutment or spring seat 82 on carriage 55. Nuts 88 are threaded on the ends of reduced portions 83 of bars 84 outwardly of the associated spring seats to anchor the bars against movement of more than a predetermined amount in a forward direction. For a purpose to be described, each forward link 70 has an abutment 90 welded thereto to extend upwardly and forwardly therefrom.

BACKING IRON OSCILLATION MEANS

Rear beam 25 has two pairs of bearings 28 welded thereto, one on each side of cylinder 40. Each pair of bearings 28 carries a pin 91 which serves as a pivot for the end of a swing cylinder assembly, or swing actuator, 95 comprising a cylinder 92 and a piston rod 93. The outer or forward end of each piston rod 93 is connected to a respective bearing block 94 embracing the shaft 85. Swing cylinder assemblies 95 effect the oscillation of backing iron 50 through a preselected arc over the back of a book.

A third bearing block 96 is rotatably secured on shaft 85, and this bearing block is connected to the piston rod of a hydraulic cylinder 100. The cylinder 100 has a bearing block 97 secured to its lower end and rotatably engaging a cross shaft 98. Shaft 98 is swingably suspended upon a pair of links 99 which are pivoted on the frame of the machine. Cylinder 100 acts as an "assist" or "helper" during oscillation of backing iron 50. Thus, when brackets 86 are near the limit of their stroke in either direction, the mechanical advantage exerted by the actuators 95, in an upward or downward direction, is very small. At these times, cylinder 100 is activated to give an upward push, or downward pull, depending upon the direction of vertical movement of backing iron 50.

As stated, the rear edges of movable jaws 35 are formed with slots 38 and 39. A pivot pin 103 extends inwardly from each edge of the movable jaw 35 and across each of the adjacent slots 38 and 39. Each slot 39 receives the upper end of an angle lever 104 forming part of centering means for backing iron 50. Each lever 104 has one end pivoted on a pin 103, and the forward end of each lever 104 is pivotally connected to one end of a link 106 whose opposite end is pivotally connected to the adjacent side of frame 20. Each lever 104 has a yoke 107 pivotally secured thereto intermediate the extent of its upwardly extending arm, and each yoke 107 is secured to the rear end of a rod 108 whose forward end is provided with a bearing block 109 embracing the associated pin 54 of carriage 55.

Each slot 38 receives the upper end of a respective link 105 which is pivotal about the associated pin 103. The lower end of each link 105 is pivotally connected to one end of a relatively short link 111 whose opposite end is pivotally connected to the machine frame. A respective yoke 110 is pivotally connected to each long link 105 at substantially its mid-point, and a rod 112 connects each yoke 110 to a bearing block 113 on shaft 98.

With links 105 being connected at their upper ends to movable jaw 35, when the latter is moved forwardly to engage a book, the upper ends of links 105 are moved forwardly the same distance, for example, four inches. This will result in a two inch forward movement of yokes 110 and a corresponding two inch adjustment of the position of cross shaft 98 and thus of actuator 100. At the same time, such forward movement of movable jaw 35 results in forward movement of the pivot point of angle lever 104 and thus a movement of yokes 107. This, in turn, adjusts the position of carriage 55, and thus of backing iron 50, with respect to the thickness of the book engaged by the fixed and movable jaws.

THE BOOK SUPPORT MECHANISM

Upon its initial introduction between rounding rollers 45, 45' the book is supported upon a book support generally indicated at 115. This book support 115 is withdrawn out of the way during the rounding operation. Book support 115 comprises a substantially flat pate 116 having very thin fins, vanes, or ribs 117 on its upper surface and each arranged to engage in one of the slots 33 in the under surface of rear jaw 35. The fins or vanes form a plurality of laterally spaced supports for a book placed between rounding rollers 45, 45' and clamping jaws 30, 35, thus avoiding, to a major extent, interference with proper positioning of the book due to knots, glue lumps, and the like on the back of the book.

A pair of arms 118 are fixedly secured to the under surface of plate 116 to extend downwardly and forwardly therefrom, and the lower ends of these arms are pivotally connected to respective arms 119 whose opposite ends are non-rotatably fixed to a sleeve 120 rotatably mounted on a cross shaft 121 supported in the machine frame. A relatively light tension spring 122 is connected between each arm 118 and its associated arm 119, these springs tending to make the connected arms 118 and 119 swing toward each other. For a purpose to be described, a chain 123 is connected between the rear edge of support 115 and a relatively fixed part of cylinder device 40. This chain limits the longitudinal position of support 115, in a forward direction, to prevent the front edges of fins 117 from touching the front jaw 30.

A third arm 124 is non-rotatably secured to sleeve 120 and extends diametrically opposite to arms 119, or in a forward direction. A relatively enlongated link 126 has its upper end pivotally secured to the free end of arm 124 and its lower end pivotally connected to an intermediate point, adjacent the free end, of a lever 125 adjacent the operator's or front end of the machine and pivotally connected to the machine frame at its left end, as indicated at 127. By means of a universal-type joint, the free right end of lever 125 is connected to the free front end of a relatively elongated lever 130 extending along the right hand side of the machine, as viewed from the operator's end, and adjacent the base thereof. The rear end of lever 130 is pivoted, at 128, to the frame of the machine.

Links 131 and 132 have clevises 133 and 134, respectively, at their lower ends connected to spaced points along lever 130. The upper end of lever 131 is pivotally connected to the crank arm 48 for book rounding roller 45, and the upper end of lever 132 is pivotally connected to the crank arms 48' for rounding roller 45'. Due to the different distances of clevises 133 and 134 from pivot point 128 of lever 130, link 131 will have a greater upward movement than link 132 during clockwise or upward swinging of lever 130. The lengths of the crank arms 48 and 48' differ, with crank arm 48 being longer than crank arm 48'. The difference in lengths is so selected that, upon upward swinging of lever 130, crank arms 48 and 48' will have identical angular movements, but in opposite directions.

Lifting of lever 130 is effected by a hydraulic actuator generally indicated at 135 as including a cylinder 136 and a piston rod 137. The lower end of piston rod 137 carries a clevis 138 which is pivotally secured to lever 130 forwardly of the clevis 133. Actuator 135 is adjustable vertically of the machine frame in order to preselect the desired effective stroke of lever 130. For this purpose, the upper end of cylinder 136 is pivotally connected to the lower end of a threaded rod 141 which extends through a gear housing mounted on the frame. Within the gear housing, rod 141 is threadedly engaged through a worm wheel 142 which meshes with a worm 143A on a shaft 143 which extends forwardly through the operator's end of the frame and has a hand wheel 140 secured thereto. By turning hand wheel 140, cylinder 136 may be adjusted vertically of the frame and thus effect a corresponding adjustment in the effective stroke of lever 130. As will be described, actuator 135 controls the positioning of book support 115 and the operation of rounding rollers 45 and 45'.

BACKING IRON TIGHTENING MECHANISM

Figure 8B:
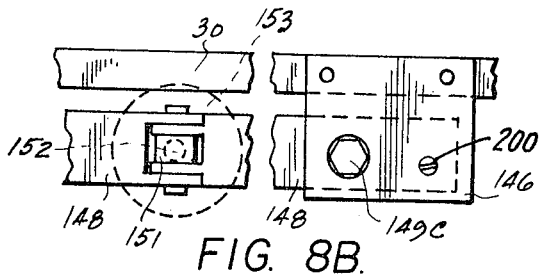
FIG. 8B is a partial end elevation view illustrating a detail of FIGS. 8 and 8A.
Figure 8A:
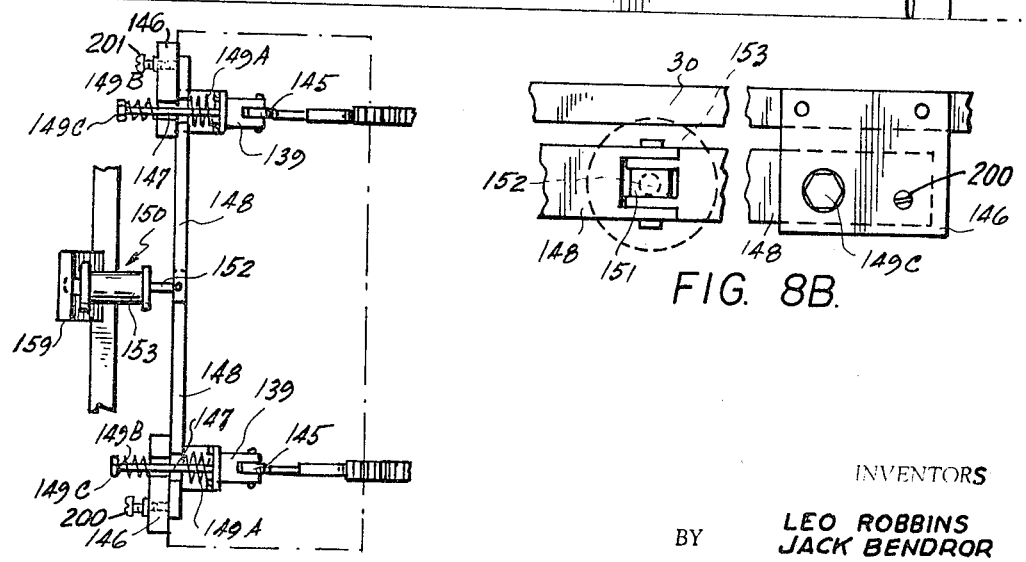
FIG. 8A is a plan view illustrating a tightening actuator and associated parts.

Mention has previously been made of the abutments 90 extending from tightening adjustment links 70 toward the front of the machine. These abutments cooperate with means for effecting a tightening or reduction of the radius of the path of backing roller 50 during its oscillation over the back of the book. Referring to FIGS. 8, 8A and 8B, a pair of brackets 146 are secured to the front edge of front beam or fixed jaw 30, one adjacent each end thereof, and these brackets have apertures aligned with abutments 90. The apertures in support brackets 146 slidably receive rods 147 having respective rollers 145 on their rear ends each arranged to engage an abutment 90. Heavy springs 149A supply some elasticity to rollers 145, and light springs 149B located between the brackets 146 and nuts 149C hold the roller assembly 145, 139, 147 singly against the heavy springs 149A.

A pair of levers 148 are provided, each bearing at one end on a respective support bracket 146. Rods 147 extend through apertures inwardly of the bearing ends of the respective levers 148. From FIGS. 8 and 8A, it will be noted that brackets 146 are essentially channel shape in side elevation, providing for roller clevises 139 of the respective rods 147.

The inner ends of levers 148 are articulated together and to a clevis 151 or the like on the end of a piston rod 152 of a hydraulic actuator 150 having a cylinder 153. Cylinder 153 is suitably supported at the front of the machine frame by a bracket 159. As piston rod 152 is extended, levers 148 push on springs 149A to push rollers 145 rearwardly. Further adjustment is provided for each side by threaded screws 200 and 201 which are threaded more or less into brackets 146 to bear against levers 148.

ELECTRICAL AND HYDRAULIC CONTROL SYSTEM

Mounted on the rear beam 25 there is a control housing 154 which contains relays and other electrical components controlling the operation of the machine. Housing 154, which is accessible from the rear for inspection, repair and replacement of parts, has a sloping indicator panel 155 as its front cover. Indicator panel 155 provides the operator with a complete set of indications at all times as to the operation of the machine. At the left of this control panel, there is an indicator 156 which gives an indication of the arc of rounding of the back of a book, as preselected by adjustment of hand wheel 65. At the center of the panel, there is a schematic representation of fixed jaw 30, movable jaw 35, book clamping and feeding rollers 45, 45', and rounding iron 50. The representations of the two jaws 30 and 35 are provided with arrows 157 which indicate when these jaws are pressing against a book schematically illustrated at 158. Backing iron 50 is illustrated as a pair of translucent circles 160F and 160R which light when the backing iron is in its front position or in its rear position. These indicators 160F and 160R are illuminated alternately as backing iron 50 is cycled over the back of a book. To the right of the center of the panel, there is a counter 161 indicating the number of completed books. Just to the right of indicator 161 there are a pair of buttons to start and to stop the machine.

Cylinder 135 has a pointer 144 secured thereto and extending through a slot in a cover for the operator's end of the machine. This pointer cooperates with a scale 164 to provide the operator with an indication of the adjusted position of cylinder 135 as set by operation of hand wheel 140.

Figure 11:
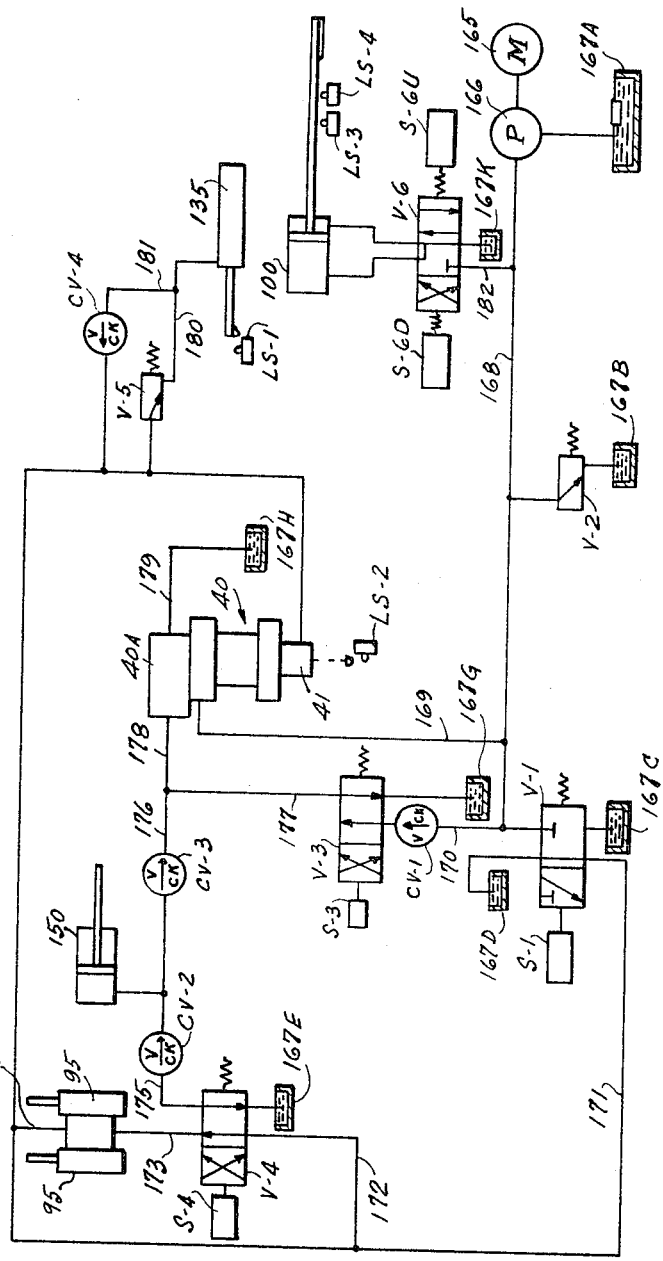
FIG. 11 is a schematic hydraulic circuit diagram of the apparatus.

The hydraulic circuitry of the machine is shown in FIG. 11, in which those elements shown mechanically in the other figures have been given the same reference characters. A motor 165 drives a pump 166 which receives hydraulic fluid from a sump indicated at 167A. Other sumps are indicated at 167B through 167K. While separate sumps are illustrated, it will be understood that they can be parts of a single sump. Control of the functions of the machine is effective by a plurality of solenoid operated and pressure fluid operated valves.

Pump 166 delivers hydraulic fluid under pressure to a supply line 168 which is connected to a normally closed, solenoid operated control valve V-1 which is opened by energization of a solenoid S-1. A pressure relief valve V-2 is connected to line 168 and opens to sump 167B when the pressure in line 168 exceeds a preset value selected by adjustment of valve V-2. A branch line 169 extends from supply line 168 to hydraulic pressure device 40 which is identical with that shown in the above-mentioned U.S. Patent No. 3,068,841, line 169 being connected to the central passage 30 shown in FIG. 2 of said patent.

Through another branch line 170, fluid under pressure is supplied to a normally closed valve V-3 which is opened by energization of a solenoid S-3. A check valve CV-1 is connected in line 170.

Valve V-1, in its "off" position, normally connects sump 167D to a line 171 connected to the small hollow piston 41 of the hydraulic pressure device 40. A branch line 172 connects line 171 to a "swing" valve V-4 which is operated to an "on" position by energization of a solenoid S-4. In its "off" or de-energized position shown in the drawings, but only when the solenoid S-1 of valve V-1 is energized, valve V-4 supplies pressure fluid through a line 173 connected to one side of the pistons of the swing cylinders 95, with fluid under pressure being supplied to the opposite side of these pistons by a branch line 174 connected to line 171. In this "off" position, valve V-4 also connects a line 175 to sump 167E. Swing actuators 95 normally maintain carriage 55 in a position in which backing iron 50 is at its forward limit of movement.

Line 175 supplies fluid under pressure to tightening actuator 150, there being a check valve CV-2 in this line. A line 176, in which there is a check valve CV-3, connects tightening actuator 150 to a line 177 which, in the "off" position of valve V-3, is connected to sump 167G. A line 178 connects line 177 to the valve component of hydraulic pressure device 40, such as to the nipple 56 shown in FIG. 2 of said Patent No. 3,068,841. For ready reference, this valve component of the hydraulic pressure device 40 is designated 40A. A line 179 connects the nipple 60 (FIG. 2 of Patent No. 3,068,841) of valve component 40A to a sump 167H.

Line 171 is also connected to a pressure responsive valve V-5, which opens, when the pressure in line 171 exceeds a preset valve preselected by adjustment of valve V-5, to connect line 171 to a line 180. Line 180 is connected to one end of actuator 135, and by a line 181 through a check valve CV-4 back to the line 171.

A branch line 182 connects supply line 168 to a valve V-6 which, in the neutral position illustrated, connects both sides of actuator 100 to a sump 167K. Valve V-6 is operated to either one of two positions by energization of solenoids S-6U and S-6D and, in one operative position, connects one side of actuator 100 to line 168 and the other side to sump 167K and, in the opposite position, connects such other side to line 168 and such one side to sump 167K.

Control of the various portions of the cycle of operation is effected by a number of limit switches, associated with movable parts of the apparatus, in cooperation with a plurality of relays controlling energization of the several solenoid coils for operating the valves. As schematically illustrated in the hydraulic circuit diagram of FIG. 11, a limit switch LS-1 is associated with the actuator 135 for the rounding rollers. A second limit switch LS-2 is closed by backward movement of rounding roller 45, against the effect of springs 47, when the book is clamped between front jaw 30 and rear jaw 35. There are a pair of limit switches LS-3 and LS-4 operated by the assist actuator 100. Switch LS-3 is a single pole double throw switch which is reversed in position about half-way between the center and the limit of movement of backing iron 50 in either direction, whereas switch LS-4 is a normally closed single pole switch which is opened just as backing iron 50 reaches its limit of movement in either direction.

OPERATION OF THE MACHINE

The operation of the machine during a book backing operation will now be described, with reference during such description being made not only to FIGS. 1 through 11, but also to the schematic wiring diagram of FIG. 12.

To prepare the machine for operation, the operator turns hand wheel 65, watching indicator 156, to preselect the relative roundness of the back of finished books. This determines the path of movement of carriage 55 when moved toward rollers 145 by forward movement of rear jaw 35 through levers 104, yokes 107 and rods 108. As the resulting orientation of carriage 55 with respect to rollers 145 determines the point at which rollers 145 will engage abutments 90 to rotate segment gears 75 and thus decrease the spacing of the pivot points 78 of the links supporting brackets 80, this will determine the effective arc of movement of roller 50 during its action on the back of the book.

The operator further adjusts hand wheel 135, viewing the position of pointer 144 with reference to scale 164, and thus adjusts the vertical position of lift cylinder 135 which, in turn, adjusts the amplitude of movement of lever 130 upon operation of cylinder 135. It will be appreciated that this adjustment, in turn, effects the amount of angular rotation of book clamping and feeding rollers 45 and 45′ upon operation of lift cylinder 135. It should be noted that, at this time, book support 115 is positioned directly beneath the clamping jaws and with fins 157 engaged in slots 33 in the undersurface of rear movable jaw 35. The machine is now ready to receive a stack of bound pages to be shaped on their back surface.

Power for the control circuitry and for operating the apparatus is supplied from a suitable commercial source, such as the 220 volt A.C. source indicated in FIG. 12. A transformer 183 has its primary winding 183P arranged to be connected across this source, and its 6 volt secondary winding 183S supplies potential for the indicator lamps. A normally open foot pedal control switch 185 is operable to connect primary winding 183P and motor 165 across lines L-1 and L-2 connected to the A.C. source.

The operator places the sewn stacked sheets to be rounded against roller 45 on fixed front jaw 30 and with the back edges of the sheets resting on vanes 117 of book support 115. Due to the relatively wide spacing and thin nature of these blades or vanes 117, the evenness of the back of the stack of sheets is not disturbed by the presence of knots in the thread or lumps of glue, as might happen if the sheets were placed upon a continuous flat and planar support surface. This support 115 constitutes a novel feature of the invention in that it provides for an even support of the stacked sheets irrespective of the presence of thread knots and glue lumps on the back to be rounded.

With the stacked sheets thus positioned, the operator of the machine steps on the foot pedal to close switch 185. This connects transformer 183 and motor 185 to a line L-2. Solenoid S-1 for operating control valve V-1 is connected between line L-2 and line L-1 in series with a parallel combination of a normally closed contact 6-4 of a relay 6 and a normally open contact 8-3 of relay 8. Consequently, solenoid S-1 is energized and shifts the position of valve V-1 from that shown in FIG. 11 to a position in which line 168 is connected to line 171 and thus supplies hydraulic fluid under pressure thereto. Hydraulic fluid under pressure is thus supplied to small hollow piston 41 of hydraulic pressure device 40. This small hollow piston begins to move forwardly, thus moving movable jaw 35 toward fixed jaw 30 and, at the same time, drawing hydraulic fluid into the area beneath the relatively large piston of hydraulic actuator device 40. As the roller 45′ engages the side of the book opposite to that engaged by roller 45, the book is clamped between rollers 45 and 45′, the pressure in line 171 builds up and this opens valve V-5 so that fluid under pressure is supplied through line 180 to actuator 135.

The electric power is also connected across the input terminals of a full wave rectifier 184, whose output terminals are connected to a positive line L-4 and a negative line L-5, and thus a potential is applied between line L-4 and line L-5.

When actuator 135 is thus supplied with hydraulic fluid under pressure, its piston moves upwardly drawing up on piston rod 137 and thus swinging lever 130 about pivot point 128, and at the same time effecting counterclockwise movement of lever 125 about pivot point 127. The lifting of lever 130, through links 131 and 132, operates cranks 48 and 48′ to rotate rollers 45 and 45′ conjointly in a direction to move the book downwardly, and causing the back of the book to assume a convex shape.

Figure 10:
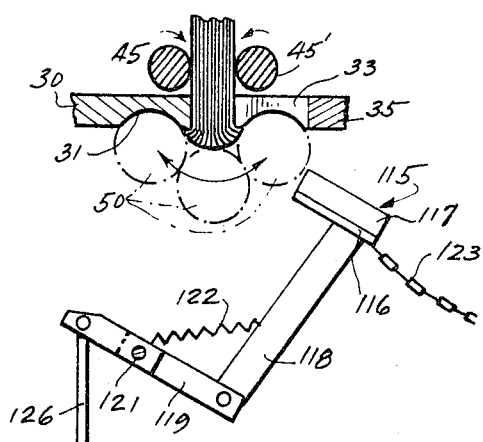

At the same time, the lifting of lever 125, through link 126, pivoted arm 124 and sleeve 120 acting upon support arms 119, swings book support 115 downwardly and rearwardly, with chain 123 becoming slack. The book is thus now held solely by rollers 45 and 45′, and book support 115 is moved out of the path of movement of backing iron 50, as illustrated in FIG. 10.

As actuator 135 moves levers 125 and 130 to the limit of upward movement thereof, as preset by adjustment of handle 140, the actuator closes limit switch LS-1 to engage a contact 186. With the electrical parts occupying the positions shown in FIG. 12, a line L-6 is connected to line L-5 through normally closed contacts 9-2 of a de-energized relay R9. Thus, closure of limit switch LS-1 will energize a relay 8 which locks through its contacts 8-1. Relay 8 energizes solenoid S-3 of valve V-3 and also lights lamp 163 at the right hand side of control panel 155.

Energization of solenoid S-3 shifts the position of valve V-3 to connect line 170 to line 177 and thus supply, through line 178, hydraulic fluid under pressure to control valve part 40A of hydraulic actuator device 40. The hydraulic fluid under pressure is thus admitted beneath the large piston of device 40, forcing jaw 35 under high pressure toward fixed jaw 30 until the book is clamped directly between jaws 30 and 35. During this operation, rollers 45 and 45′ are moved back from the clamping edges of the respective jaws 30 and 35 against the force of coil spring 47.

Such backward movement of roller 45 closes a limit switch LS-2 against the contact 187, and this energizes a relay R-10 which locks through its contacts 10-1 and energizes a line L-7. Relay 10 further sets up a circuit for lamp 157, to light arrows 157 on panel 155.

Application of potential to line L-7 transfers relay R-3 which closes its contacts 3-1 to interconnect lines L-2 and L-3 so that the operator may remove his foot from the pedal without stopping operation of the machine. Relay R-3 also closes its contacts 3—3 which are included in the energizing circuit for the solenoids S-6D and S-6U for assisting cylinder 100. The actuator 100 is energized in a "down" direction by virtue of energization of solenoid S-6D which moves valve V-6 to the right from the neutral position shown in FIG. 11 to apply pressure to the right of the piston attached to piston rod 101 which piston, at this time, is at its extreme right position. Actuator 100 thus assists swing actuators 95, which can exert little mechanical effort in a vertical direction at either extreme position of backing iron 50.

Transfer of relay R-10 also results in transfer of relay R-5. Transfer of relay 5 energizes swing cylinders 95 to start to move backing roller or iron 50 from its forward extreme limit of movement to its rearward extreme limit of movement.

At this time, lamp 160R lights, indicating that the backing iron is moving toward its rear position. Energization of swing actuators 95 is effected by energization of solenoid S-4 which switches valve V-4 to a position in which hydraulic fluid under pressure is applied only to the upper sides of the pistons, as viewed in FIG. 11, and the lower sides of the pistons, or the rear sides thereof, are connected to sump 167E.

As soon as piston rod 101 of assist actuator 100 begins to move to the left, as viewed in FIG. 11, limit switch LS-4 is closed to engage contact 188 and transfer relay R-2A. Relay R-2A establishes a connection between lines L-2 and L-3, and shunt connection between lines L-7 and L-8. Relay R-5 remains energized through its holding contacts 5-1.

Shortly after closing of limit switch LS-4, further movement downward of piston rod 101 effects transfer of limit switch LS-3 to disengage contact 191 and engage contact 192. This drops relay R-3 but line L-2 remains connected to line L-3 through closed contacts 2A-1. Dropping of relay R-3 opens contacts 3—3 and so de-energizes solenoid S-6D, causing the valve V-6 to center and thus de-energizing actuator 100. Engagement of switch LS-3 with contact 192 transfers relay R-2 which closes its contacts 2-1, 2—2 and 2-3, and reverses its contacts 2-4 and 2-5, thus changing the energizing circuit for actuator 100 to prepare the latter for energization in an upward direction. Relay R-2 is held closed through its contacts 2-3 and closed limit switch LS-4.

Swing actuators 95 continue to move backing iron 50 to its rear position and after backing iron 50 passes the center of its movement, piston rod 101, or means connected therewith, move limit switch LS-3 from contact 192 to contact 191. Relay R-2 remains energized through contacts 2-3 and limit switch LS-4, and relay R-3 is energized. Actuator 100 is now energized through solenoid S-6U switching valve V-6 to the left to apply pressure fluid to the underside of the piston connected to piston rod 101, and thus assists the upward movement of backing iron 50 at a time when the mechanical advantage afforded by swing cylinders 95, in a vertical direction, is at a minimum. At this time, as contacts 2—2 remain closed, relay R-4 is energized and locks.

Dropping of relay R-5 results in transfer of relay R-6, and transfer of relay R-4 drops relay R-5 to reverse the energization circuit of swing cylinders 95. Transfer of relay R-6 completes an energizing circuit for relay R-9, which closes its contacts 9-1, opens its contacts 9-2, and closes its contacts 9-3. Contacts 9-3 complete an energizing circuit for coil 190 of counter 161 so that the latter will count "one."

At the end of this stroke of iron 50, limit switch LS-4 is disengaged from contact 188, thus dropping relay R-2A and relay R-2 to change the circuit connections for energization of actuator 100. Dropping of relay R-2A opens the holding circuit of relay R-5 and thus de-energizes solenoid S-4. The rear ends of cylinders 95 now receive pressure from line 173, and since the ends of these cylinders have larger areas than the rod-ends, the cylinders 95 are energized to move backing iron 50 forwardly, with this movement being assisted by actuator 100.

The cyclic action continues until four "passes" of backing iron 50 over the back of the book have been made. The combination of relays forms a ring counter, so that, at the end of four "passes" of backing iron 50, the holding circuit for relay R-8 is broken while the holding circuit for relay R-6 remains closed, thus de-energizing solenoid S-1, which operates valve V-1 to interrupt the connection between lines 168 and 171, thus resulting in a condition of operation of device 40 such that movable jaw 35 is retracted to the rear of the machine. The parts then reassume the positions illustrated in the drawings.

It should be noted at this point that simultaneous with the first rearward movement of backing iron 50, the energization of tightening cylinder 150, by energization of solenoid S-4 to operate valve V-4, will have engaged rollers 145 with abutments 90 so as to rotate segment gears 75 in a direction to swing pivot points 78 for swing links 79 of bracket 80 to a spacing corresponding to the desired curvature to be imparted to the back of the book.

Figure 9:
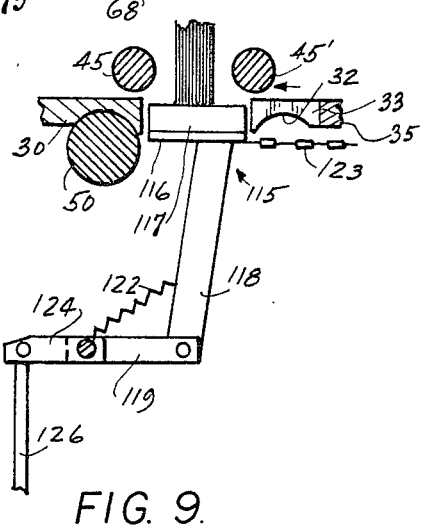
FIGS. 9 and 10 are somewhat schematic partial side elevation views illustrating the rounding and backing operations.

Upon de-energization of actuator 135, book support 115 reassumes the position shown in FIG. 9. In so doing, the book support is first swung counterclockwise, with arm 118 being drawn toward 119 by spring 122. As plate 116 with blades 117 approaches the undersurface of movable jaw 35, chain 123 becomes taut so that thereafter the movement of book support 115 is an upward direction with blades 117 entering into the slots 33 in the undersurface of movable jaw 35.

While an automatic sequence of operation involving four "passes" of backing iron 50 over the back of the book has been described, it is possible to condition the mechanism for rounding only, without passing the backing iron 50 over the back of the book. This is done by operation of manual selector switch SW to disengage contact 193. This opens the circuit controlled by limit switches LS-1 and LS-2 which effect the automatic cycling of the apparatus. With switch SW open, the movement of movable jaw 35 toward fixed jaw 30 and the operation of the rounding rollers 45, 45' occurs as well as the withdrawal of the book support 115. However, closure of switch LS-1 would be of no effect. As a result of this, the system will come to rest after the book is rounded without backing.

While a specific embodiment of the invention has been shown and described in detail to illustrate the application of the principles of the invention, it will be understood that the invention may be embodied otherwise without departing from such principles.

What is claimed is:

1. In apparatus for rounding and backing books, a backing roller; means for feeding a book toward an operating path of said backing roller for engagement of the book back with the backing roller to form the book back; two pairs of first links, one pair at each end of said backing roller, with the links of each pair being pivotally suspended from the respective pivot axes spaced from each other, said first links having free ends; a pair of supports each rotatably connected to the free ends of a respective pair of first links and fixedly spacing the associated free ends; two pairs of second links, each adjacent a respective pair of first links and each having a free end pivotally suspending a respective first link for swinging of the latter about its respective pivot axis; said supports rotatably supporting said backing roller; means operable to oscillate said supports, about said pivot axes, through a substantially circular arc; and means operable to adjust the spacing of the free ends of said second links to adjust the spacing of said pivot axes to adjust the radius of said arc.

2. In apparatus for rounding and backing books, as claimed in claim 1, normally retracted clamping means operable to clamp and feed a book toward an operating path of said backing iron for engagement of the book back with the backing iron to form the book back; a support positioned in a space between said clamping means for temporarily supporting a book prior to engagement of the book by said clamping means; and means operable, responsive to engagement of said book by said clamping means, to feed the book toward such operating path and to retract said support means from its support position and from said operating path.

3. In apparatus for rounding and backing books, as claimed in claim 1, normally retracted clamping means operable to clamp and feed a book toward an operating path of said backing roller or iron for engagement of the book back with the backing roller or iron to form the book back; a support positioned in a space between said clamping means for temporarily supporting a book prior to engagement of the book by said clamping means; said support comprising plural upright vanes having their edges arranged to contact and support the back of a book, said vanes extending transversely of the book back and being substantially spaced longitudinally of the book back; means operable, responsive to engagement of said book by said clamping means to feed the book toward such operating path and to retract said support means from its support position and from said operating path.

4. In apparatus for rounding and backing books as claimed in claim 1 normally retracted clamping means for feeding a book toward the operating path of said backing roller or iron and operable to clamp the book while the latter is temporarily supported upon and removable support; a movable support for supporting the book prior to clamping thereof by said clamping means, said movable support engaging the back of a book supported thereon only along plural very narrow zones extending transversely of the book back and spaced longitudinally of the book back; and means operable to withdraw said support, upon clamping of the book by the clamping means, from its book supporting position and out of the path of movement of the backing roller or iron.

5. In apparatus for rounding and backing books, as claimed in claim 4 said movable support comprising a substantially flat plate having relatively elongated, vertically oriented thin vanes extending from its upper surface and extending transversely of the space between said clamping means, said vanes having edge engagement with the back of a book and extending transversely of the book back while being spaced longitudinally thereof.

6. In apparatus for rounding and backing books, a support frame; a fixed clamping jaw mounted on said frame; a movable clamping jaw mounted on said frame for movement relative to said fixed clamping jaw, and normally retracted from said fixed clamping jaw to leave a book receiving space between the facing edges of said fixed and movable clamping jaws; a support arranged to be positioned in said book receiving spaced to temporarily support a book to be engaged by said fixed and movable clamping jaws; said support comprising a substantially flat plate which, in the book supporting position, extends substantially parallel to the plane of movement of said movable clamping jaw, said plate having, on its upper surface, plural relatively thin vertically oriented blades extending transversely of the book receiving space to provide spaced line engagement with the back surface of a book introduced into said book receiving space; the undersurface of said movable clamping jaw, adjacent its edge facing said fixed clamping jaw, being formed with a series of slots to receive said vanes when said support is in the book receiving position; and means mounting said book support for swinging movement toward and away from the book receiving position.

7. In apparatus for rounding and backing books, a support frame; a fixed clamping jaw mounted on said frame; a movable clamping jaw mounted on said frame for movement relative to said fixed jaw, and normally retracted from said fixed clamping jaw to leave a book receiving space between the facing edges of said fixed and movable clamping jaws; a support arranged to be positioned in said book receiving space to temporarily support a book to be engaged by said fixed and movable clamping jaws; said support comprising a substantially flat plate which, in the book supporting position, extends substantially parallel to the plane of movement of said movable clamping jaw, said plate having, on its upper surface, plural relatively thin vertically oriented vanes extending transversely of the book receiving space to provide spaced line engagement with the back surface of a book introduced into said book receiving space; the undersurface of said movable clamping jaw, adjacent its edge facing said fixed clamping jaw, being formed with a series of slots to receive said vanes when said support is in the book receiving position; a pair of support arms fixed to and extending from said plate; a pair of second arms, each pivotally connected at one end to a lower end of a respective support arm and each having a second end secured to a rock shaft extending transversely of said frame; spring means connected between each support arm and the associated second arm and biasing said support arms to swing toward said rock shaft; means operable to rock said rock shaft to swing said book support between a book receiving position and a retracted position; and means operable during swinging of said book support to the book receiving position to restrict swinging of said support arms and restraining said support arms to movement in a vertical direction to engage said vanes in said slots; said substantially vertical movement of said support arms being provided by tensioning of spring means.

8. In apparatus for rounding and backing books, a support frame; a fixed clamping jaw mounted on said frame; a movable clamping jaw mounted on said frame for movement relative to said fixed jaw, and normally retracted from said fixed clamping jaw to leave a book receiving space between the facing edges of said fixed and movable clamping jaws; a support arranged to be positioned in said book receiving space to temporarily support a book to be engage by said fixed and movable clamping jaws; said support comprising a substantially flat plate which, in the book supporting position, extends substantially parallel to the plane of movement of said movable clamping jaw, said plate having, on its upper surface, plural relatively thin vertically oriented vanes extending transversely of the book receiving space to provide spaced line engagement with the back surface of a book introduced into said book receiving space; the undersurface of said movable clamping jaw, adjacent its edge facing said fixed clamping jaw, being formed with a series of slots to receive said vanes when said support is in the book receiving position; a pair of support arms fixed to and extending from said plate; a pair of second arms, each pivotally connected at one end to a lower end of a respective support arm and each having a second end secured to a rock shaft extending transversely of said frame; spring means connected between each support arm and the associated second arm biasing said support arms to swing toward said rock shaft; means operable to rock said rock shaft to swing said book support between a book receiving position and a retracted position; means operable during swinging of said book support to the book receiving position to restrict swinging of said support arms and restraining said support arms to movement in a vertical direction, said substantially vertical movement of said support arms being provided by tensioning of spring means; and control mechanism operable, responsive to movement of said movable clamping jaw toward said fixed clamping jaw to clamp a book supported on said book support, to actuate said rock shaft rocking means to swing said book support to the retracted position to provide for support of the book solely by said fixed and movable clamping jaws.

9. In apparatus for rounding and backing books, as claimed in claim 1, a support frame; means for feeding a book toward an operating path of said backing iron for engagement of the book back with the backing iron to form the book back; a backing iron carriage; link means supporting said carriage on said frame for movement of said carriage while said carriage remains parallel to a horizontal plane; said second links comprising a pair of support links each pivotally mounted at its other end on said frame at pivots spaced apart longitudinally of said frame; said first links comprising a pair of suspension links each pivotally suspended from a respected support link, and means operable conjointly to angularly adjust said support links about their pivots on said carriage to adjust the spacing of the pivot axes of said suspension links to adjust the radius of said arc.

10. In apparatus for rounding and backing books, a support frame; a backing iron; means for feeding a book toward an operating path of said iron for engagement of the book back with the iron to form the book back; an iron carriage; link means supporting said carriage on said frame for movement of said carriage while said carriage remains parallel to a horizontal plane; a pair of support links each pivotally mounted at one end of said frame at pivots spaced apart longitudinally of said frame; a pair of suspension links each pivotally suspended from respective spaced pivot points at the upper ends of respective support links, said suspension links having free lower ends; a support interconnecting the free ends of said suspension links and rotatably supporting said iron; means operable to oscillate said support, about the pivot points of said suspension links, through a substantially circular arc with the iron in engagement with the back of a book; and means operable conjointly to angularly adjust said support links about their pivots on said carriage to adjust the spacing of the pivot points of said suspension links to adjust the radius of said arc; said means operable to conjointly adjust said support links comprising intermeshing gear components each secured to a respective support link.

11. In apparatus for rounding and backing books, a support frame; a backing iron; means for feeding a book toward an operating path of said iron for engagement of the book back with the iron to form the book back; a backing iron carriage; link means supporting said carriage on said frame for movement of said carriage while said carriage remains parallel to a horizontal plane; pairs of support links pivotally mounted on said carriage at pivots spaced apart longitudinally of said frame; pairs of suspension links pivotally suspended from the upper ends of respective support links, said suspension links having free lower ends; a support interconnecting the free ends of respective support links, said suspension links having free lower ends; a support interconnecting the free ends of said suspension links and supporting said backing iron; means operable to oscillate said support, about the pivot points of said suspension links, through a substantially circular arc with the backing iron in engagement with the back of a book; means operable conjointly to angularly adjust said support links about their pivots on said carriage to adjust the spacing of the pivot points of said suspension links to adjust the radius of said arc; said means for feeding a book comprising a fixed clamping jaw and a movable clamping jaw mounted on said frame for movement relative to said fixed clamping jaw and normally retracted therefrom to leave a book receiving space between facing edges of said fixed and movable clamping jaws; means operable to move said movable clamping jaw toward said fixed clamping jaw to clamp a book, positioned in said book receiving space, between the facing edges of said fixed and movable clamping jaws; and means interconnecting said movable clamping jaw and said carriage and operable to move said carriage, responsive to movement of said movable clamping jaw, to center said support links relative to a book clamped between said fixed and movable clamping jaws.

12. In apparatus for rounding and backing books, a support frame; a backing iron; means for feeding a book toward an operating path of said iron for engagement of the book back with the backing iron to form the book back; a backing iron carriage; link means supporting said carriage on said frame for movement of said carriage while said carriage remains parallel to a horizontal plane; pairs of support links pivotally mounted on said carriage at pivots spaced apart longitudinally of said frame; pairs of suspension links pivotally suspended from the upper ends of respective support links, said suspension links having free lower ends; a support interconnecting the free ends of said suspension links and supporting said backing iron; means operable to oscillate said support, about the pivot points of said suspension links, through a substantially circular arc with the backing iron in engagement with the back of a book; means operable conjointly to angularly adjust said support links about their pivots on said carriage to adjust the spacing of the pivot points of said suspension links to adjust the radius of said arc; adjustment means extending longitudinally of said frame and pivotally suspended therefrom at a pair of longitudinally spaced points; manual means operable to adjust said adjustment means longitudinally of said frame; and linkage interconnecting said carriage and said adjustment means and operable, responsive to longitudinal adjustment of said adjustment means, to adjust said carriage vertically of said frame.

13. In apparatus for rounding and backing books, a support frame; a backing iron; means for feeding a book toward an operating path of said iron for engagement of the book back with the backing iron to form the book back; a backing iron carriage; link means supporting said carriage on said frame for swinging movement of said carriage while said carriage remains parallel to a horizontal plane; pairs of support links pivotally mounted on said carriage at pivots spaced apart longitudinally of said frame; pairs of suspension links pivotally suspended from the upper ends of respective support links, said suspension links having free lower ends; a support interconnecting the free ends of said suspension links and supporting said backing iron; means operable to oscillate said support, about the pivot points of said suspension links, through a substantially circular arc with the backing iron in engagement with the back of a book; means operable conjointly to angularly adjust said support links about their pivots on said carriage to adjust the spacing of the pivot points of said suspension links to adjust the radius of said arc; adjustment means extending longitudinally of said frame and pivotally suspended therefrom at a pair of longitudinally spaced points; manual means operable to adjust said adjustment means longitudinally of said frame; linkage interconnecting said carriage and said adjustment means and operable, responsive to longitudinal adjustment of said adjustment means, to adjust said carriage vertically of said frame; an arm extending upwardly and outwardly from one of said support links and substantially radially relative to the pivot of the associated support link on said carriage; said means operable to adjust the angular position of said support links comprising an abutment engageable with said arm upon movement of said carriage longitudinally of said frame to swing the upper ends of said support links toward each other; the point of engagement with said abutment with said arm being determined by the relative height of said carriage as adjusted by said longitudinally adjustable adjustment means, whereby adjustment of said longitudinally adjustment means controls the radius of the arc of movement of said rounding iron support.

14. In apparatus for rounding and backing books, a support frame; a backing iron; means for feeding a book toward an operating path of said iron for engagement of the book back with the backing iron to form the book back; a pair of links pivotally suspended, relative to said frame, from respective spaced pivot points and having free ends; a support interconnecting the free ends of said links and rotatably supporting said backing iron; first fluid pressure actuator means extending generally longitudinally of said frame and connected at one end to said frame and at the other end to said support to oscillate said support, about said pivot points, through a substantially circular arc; second fluid pressure actuator means extending substantially vertically of said frame and connected at one end to said frame and connected at the other end to said support; and means operable, as said support approaches its limit of movement in either direction, as oscillated by said first actuator means, to selectively activate said second actuator means to impart a substantially vertically directed thrust to said support to assist the operation of said support by said first actuator means.

15. In apparatus for rounding and backing books, a support frame; a backing iron; means for feeding a book toward an operating path of said iron for engagement of the book back with the backing iron to form the book back; a pair of suspension links pivotally suspended, relative to said frame, from respective spaced pivot points and having free ends; a support interconnecting the free ends of said links and rotatably supporting said backing iron; first fluid pressure actuator means extending generally longitudinally of said frame and connected at one end to said frame and at the other end to said support to oscillate said support, about said pivot points, through a substantially circular arc; second fluid pressure actuator means extending substantially vertically of said frame and connected at one end to said frame and at the other end to said support; means operable, as said support approaches its limit of movement in either direction as oscillated by said first actuator means, to selectively activate said second actuator means to impart a substantially vertically directed thrust to said support to assist the operation of said support by said first actuator means; and means operable to adjust the spacing of said pivot points to adjust the radius of said arc.

16. In apparatus for rounding and backing books, a support frame; a fixed jaw fixedly mounted on said support frame; a movable jaw movably mounted on said support frame for movement relative to said fixed jaw, said movable jaw normally being retracted substantially from said fixed jaw to provide a book receiving space between the facing edges of said fixed and movable jaws; a pair of book engaging rounding and feeding rollers each associated with a respective one of said jaws; means rotatably mounting each roller on its respective jaw to extend parallel to the edge thereof facing the other jaw, said means biasing each roller to project outwardly of the associated edge of the respective jaw; a book support positionable between said jaws, in said book receiving space to temporarily support a book to have its back shaped; a backing iron disposed beneath said jaws; a carriage extending longitudinally of said frame beneath said jaws; means pivotally supporting said carriage from said frame for movement, with said carriage always remaining in a horizontal plane; two pairs of suspension links pivotally supported from respective pivot points spaced longitudinally of said frame, and having free ends; two pairs of interconnecting links, the free ends of said links and rotatably supporting said backing iron; means mounting said book support for movement between a book supporting position between the adjacent edges of said jaws and a retracted position displaced from the path of movement of said backing iron; first fluid pressure actuator means extending longitudinally of said frame and connected at one end to said frame and at the other end to said backing iron support to oscillate said backing iron support, about said pivot points, through a substantially circular arc; means on said frame cooperable with said carriage to adjust the spacing of said pivot points to adjust the radius of said arc; second fluid pressure actuator means operable, when activated, to move said movable jaw toward said fixed jaw for engagement of said book rounding and feeding rollers with a book supported on said book support; means connecting said carriage to said movable jaw and operable, responsive to movement of said movable jaw toward said fixed jaw, to move said carriage longitudinally of said frame to center said pivot points relative to a book on said book support; third fluid pressure actuator means operable, responsive to engagement of said book by said book rounding rollers to rotate said rollers conjointly in a direction to round and feed the book toward the operating path of said backing iron, and connected to said book support to swing said book support to the retracted position of the latter; said second fluid pressure actuator means continuing to move said movable jaw toward said fixed and movable jaws; said book rounding rollers, during such continued movement of said movable jaw, being retracted along their respective jaws against the force of the biasing means thereof; means operable, responsive to retraction movement of one of said book rounding rollers, to activate said first fluid pressure actuator means to oscillate said backing iron in engagement with the back of a book clamped between said clamping jaws; and counting means operable, responsive to a preselected number of passes of the backing iron over the back of the book, to condition said several actuator means to restore the parts to their initial condition.

17. In apparatus for rounding and backing books, a support frame; a fixed jaw fixedly mounted on said support frame; a movable jaw movably mounted on said support frame for movement relative to said fixed jaw, said movable jaw normally being retracted substantially from said fixed jaw to provide a book receiving space between the facing edges of said fixed and movable jaws; a pair of book engaging and feeding rollers each associated with a respective one of said jaws; means rotatably mounting each roller on its respective jaw to extend parallel to the edge thereof facing the other jaw, said means biasing each roller to project outwardly of the associated edge of the respective jaw; a book support positionable between said jaws, in the relatively retracted position thereof, in said book receiving space to temporarily support a book to have its back shaped; a backing iron disposed beneath said jaws; a carriage extending longitudinally of said frame beneath said jaws; means pivotally supporting said carriage from said frame for swinging movement with said carriage always remaining in a horizontal plane; a pair of suspension links pivotally suspended from respective pivot points spaced longitudinally of said frame, and having free ends; a support interconnecting the free ends of said links and rotatably supporting said backing iron; means mounting said book support for movement between a book supporting position between the adjacent edges of said jaws and a retracted position displaced from the path of movement of said backing iron; first fluid pressure actuator means extending longitudinally of said frame and connected at one end to said frame and at the other end to said backing iron support to oscillate said backing iron support, about said pivot points, through a substantially circular arc; means on said frame cooperable with said carriage to adjust the spacing of said pivot points to adjust the radius of said arc; second fluid pressure actuator means operable, when activated, to move said movable jaw toward said fixed jaw for engagement of said rounding and feeding rollers with a book supported on said book support; means connecting said carriage to said movable jaw and operable, responsive to movement of said movable jaw toward said fixed jaw, to move said carriage longitudinally of said frame to center said pivot points relative to a book on said book support; third fluid pressure actuator means operable, responsive to engagement of said book by said book engaging rollers, to rotate said rollers conjointly in a direction to round and feed the book toward the operating path of said backing, and connected to said book support to swing said book support to the retracted position of the latter; said second fluid pressure actuator means continuing to move said movable jaw toward said fixed jaw until said book is clamped directly between said fixed and movable jaws, said book rounding rollers, during such continued movement of said movable jaws, being retracted along their respective jaws against the force of the biasing means thereof; means operable, responsive to retraction movement of one of said book rounding rollers, to activate said first fluid pressure actuator means to oscillate said backing iron support in engagement with the back of a book clamped between said clamping jaws; counting means operable, responsive to a preselected number of passes of the backing iron over the back of the book, to condition said several actuator means to restore the parts to their initial condition; fourth fluid pressure actuator means extending substantially vertically of said frame and connected at one end to said backing iron support and at the opposite end to said frame and effective to move said backing iron support in a vertical direction; and means operable, as said backing iron support approaches its limit of oscillation in either direction, to activate said fourth fluid pressure actuator means to impart a vertical thrust to said backing iron support to assist the action of said first fluid pressure actuator means.

18. In apparatus for rounding and backing books, a support frame; a fixed jaw fixedly mounted on said support frame; a moveable jaw movably mounted on said support frame for movement relative to said fixed jaw, said movable jaw normally being retracted substantially from said fixed jaw to provide a book receiving space between the facing edges of said fixed and movable jaws; a pair of book engaging and feeding rollers each associated with a respective one of said jaws; means rotatably mounting each roller on its respective jaw to extend parallel to the edge thereof facing the other jaw, said means biasing each roller to project outwardly of the associated edge of the respective jaw; a book support positionable between said jaws, in the relatively retracted position thereof, in said book receiving space to temporarily support a book to have its back shaped; a backing iron disposed beneath said jaws; a carriage extending longitudinally of said frame beneath said jaws; means pivotally supporting said carriage from said frame for swinging movement with said carriage always remaining in a horizontal plane; a pair of suspension links pivotally suspended from respective pivot points spaced longitudinally of said frame, and having free ends; a support interconnecting the free ends of said links and rotatably supporting said backing iron; means mounting said book support for movement between a book supporting position between the adjacent edges of said jaws and a retracted position displaced from the path of movement of said backing iron; first fluid pressure actuator means extending longitudinally of said frame and connected at one end to said frame and at the other end to said backing iron support to oscillate said backing iron support, about said pivot points, through a substantially circular arc; means on said frame cooperable with said carriage to adjust the spacing of said pivot points to adjust the radius of said arc; second fluid pressure actuator means operable, when activated, to move said movable jaw toward said fixed jaw for engagement of said book rounding and feeding rollers with a book supported on said book support; means connecting said carriage to said movable jaw and operable, responsive to movement of said movable jaw toward said fixed jaw, to move said carriage longitudinally of said frame to center said pivot points relatively to a book on said book support; third fluid pressure actuator means operable, responsive to engagement of said book by said book rounding rollers, to rotate said rollers conjointly in a direction to round and feed the book toward the operating path of said backing iron, and connected to said book support to swing said book support to the retracted position of the latter; said second fluid pressure actuator means continuing to move said movable jaw toward said fixed jaw until said book is clamped directly between said fixed and movable jaws, said book rounding rollers, during such continued movement of said movable jaw, being retracted along their respective jaws against the force of the biasing means thereof; means operable, responsive to retraction movement of one of said book rounding rollers, to activate said first fluid pressure actuator means to oscillate said backing iron support in engagement with the back of a book clamped between said clamping jaws; counting means operable, responsive to a preselected number of passes of the backing iron over the back of the book, to condition said several actuator means to restore the parts to their initial condition; an indicator panel on said frame; first indicator means on said panel indicating the position of said backing iron during each pass thereof; second indicator means on said panel activated responsive to engagement of the book by said rounding and feeding rollers; and third indicator means on said panel activated responsive to engagement of the book directly by said clamping jaws.

19. In apparatus for rounding and backing books, a support frame; a fixed jaw fixedly mounted on said support frame for movement relative to said fixed jaw, said movable jaw normally being retracted substantially from said fixed jaw to provide a book receiving space between the facing edges of said fixed and movable jaws; a pair of book engaging and feeding rollers each associated with a respective one of said jaws; means rotatably mounting each roller on its respective jaw to extend parallel to the edge thereof facing the other jaw, said means biasing each roller to project outwardly of the associated edge of the respective jaw; a book support positionable between said jaws, in the relatively retracted position thereof, in said book receiving space to temporarily support a book to have its back shaped; a backing iron disposed beneath said jaws; a carriage extending longitudinally of said frame beneath said jaws; means pivotally supporting said carriage from said frame for swinging movement with said carriage always remaining in a horizontal plane; a pair of suspension links pivotally suspended from respective pivot points spaced longitudinally of said frame, and having free ends; a support interconnecting the free ends of said links and rotatably supporting said backing iron; means mounting said book support for movement between a book supporting position between the adjacent edges of said jaws and a retracted position displaced from the path of movement of said backing iron; first fluid pressure actuator means extending longitudinally of said frame and connected at one end to said frame and at the other end to said backing iron support to oscillate said backing iron support, above said pivot points, through a substantially circular arc; means on said frame cooperable with said carriage to adjust the spacing of said pivot points to adjust the radius of said arc; second fluid pressure actuator means operable, when activated, to move said movable jaw toward said fixed jaw for engagement of said book rounding and feeding rollers with a book supported on said jaw support; means connecting said carriage to said movable jaw and operable, responsive to movement of said movable jaw toward said fixed jaw, to move said carriage longitudinally of said frame to center said pivot points relative to a book on said book support; third fluid pressure actuator means operable, responsive to engagement of said book by said book rounding rollers, to rotate said rollers conjointly in a direction to round and feed the book toward the operating path of said backing iron, and connected to said book support to swing said book support to the retracted position of the latter; said second fluid pressure actuator means continuing to move said movable jaw toward said fixed jaw until said book is clamped directly between said fixed and movable jaws, being retracted along their respective jaws against the force of the biasing means thereof; means operable, responsive to retraction movement of one of said book rounding rollers, to said first fluid pressure actuator means to oscillate said backing iron support in engagement with the back of a book clamped between said clamping jaws; counting means operable, responsive to a preselected number of passes of the backing iron over the back of the book, to condition said several actuator means to restore the parts to their initial condition; said third actuator means having one end adjustably connected to said frame; and manual means operable to adjust the vertical position of said third actuator means to adjust the angle of rotation of said book rounding and feeding rollers.

20. In apparatus for rounding and backing books, a support frame; a fixed jaw fixedly mounted on said support frame; a movable jaw movably mounted on said support frame for movement relative to said fixed jaw, said movable jaw normally being retracted substantially from said fixed jaw to provide a book receiving space between the facing edges of said fixed and movable jaws; a pair of book engaging and feeding rollers each associated with a respective one of said jaws; means rotatably mounting said roller on its respective jaw to extend parallel to the edge thereof facing the other jaw, said means biasing each roller to project outwardly of the associated edge of the respective jaw; a book support positionable between said jaws, in the relatively retracted position thereof, in said book receiving space to temporarily support a book to have its back shaped; a backing iron disposed beneath said jaws; a carriage extending longitudinally of said frame beneath said jaws; means pivotally supporting said carriage from said frame for swinging movement with said carriage always remaining in a horizontal plane; a pair of suspension links pivotally suspended from respective pivot points spaced longitudinally of said frame, and having free ends; a support interconnecting the free ends of said links and rotatably supporting said backing iron; means mounting said book support for movement between a book supporting position between the adjacent edges of said jaws and a retracted position displaced from the path of movement of said backing iron; first fluid pressure actuator means extending longitudinally of said frame and connected at one end to said frame and at the other end to said rounding iron support to oscillate said backing iron support, about said pivot points, through a substantially circular arc; means on said frame cooperable with said carriage to adjust the spacing of said pivot points to adjust the radius of said arc; second fluid pressure actuator means operable, when activated, to move said movable jaw toward said fixed jaw for engagement of said book rounding and feeding rollers with a book supported on said book support; means connecting said carriage to said movable jaw and operable, responsive to movement of said movable jaw toward said fixed jaw, to move said carriage longitudinally of said frame to center said pivot points relative to a book on said book support; third fluid pressure actuator means operable responsive to engagement of said book by said book rounding rollers, to rotate said rollers conjointly in a direction to feed the book toward the operating path of said backing iron, and connected to said book support to swing said book support to the retracted position of the latter; said second fluid pressure actuator means continuing to move said movable jaw toward said fixed jaw until said book is clamped directly between said fixed and movable jaws, said book rounding rollers, during such continued movement of said movable jaw, being retracted along their respective jaws against the force of the biasing means thereof; means operable, responsive to retraction movement of said book rounding rollers, to activate said first fluid pressure actuator means to oscillate said backing iron support in engagement with the back of a book clamped between said clamping jaws; counting means operable, responsive to a preselected number of passes of the backing iron over the back of the book, to condition said several actuator means to restore the parts to their initial condition; fourth fluid pressure actuator means extending substantially vertically of said frame and connected at one end to said backing iron support and at the opposite end to said frame and effective to move said backing iron support in a vertical direction; means operable, as said backing iron support approaches its limit of oscillation in either direction, to activate said fourth fluid pressure actuator means to impart a vertical thurst to said backing iron support to assist the action of said first fluid pressure actuator means; and means connecting said fourth actuator means to said movable jaw and operable, upon movement of said movable jaw toward said fixed jaw, to adjust the position of said fourth actuator means to center the support point thereof, relative to said frame, with respect to a book clamped between said fixed and movable jaws.

21. In apparatus for rounding and backing books, as claimed in claim 16, two pairs of upright support links pivoted at their lower ends to said carriage, at longitudinally spaced pivots, and extending upwardly therefrom, the spaced pivot points for said interconnecting links being at the upper free ends of said support links; two pairs of segment gears, each integral with one of said support links, said segment gears being intermeshed for conjoint angular adjustment of said support links about their pivots on said carriage to adjust the spacing of said pivot points of said interconnecting links; said means operable to adjust spacing of said pivot points comprising an arm extending upwardly and forwardly at an angle to the center line of the support link; and a fifth fluid pressure actuator means supported on said frame to extend substantially horizontally thereof and operable, when activated, to position an abutment for engagement with said arm upon movement of said carriage by movement of said movable jaw to pivot said support links conjointly about their pivots on said carriage to adjust such spacing of the pivot points of said interconnecting links; said means operable to adjust the spacing of said pivot points further comprising manually adjustable means controlling the elevation of said carriage and effective to adjust said elevation to preselect the point on said arm engaged by said abutment, thereby to preselect the degree of angular adjustment of said support links.

22. In a method of rounding and backing books by clamping the book to be rounded and advancing the book into the path of a backing iron oscillatable through an arc in contact with the back of the book to shape the same: the improvement comprising the steps of normally maintaining the backing iron adjacent one end of its path of movement and out of operative relation with the book; concurrently with clamping of the book, moving the backing iron into operative engagement with the book adjacent such one end of the arcuate path of oscillation of the backing iron; and concurrently therewith adjusting the axes of oscillation of the backing iron in accordance with a preselected radius of the arc of oscillation thereof.

23. In a method of rounding and backing books comprising the steps of clamping a book in position for engagement by a backing iron and then oscillating the backing iron in an arcuate path over the book back to shape the same: the improvement comprising oscillating the backing iron through a substantially circular arc about a pair of pivot points spaced in the direction of oscillation; normally maintaining the backing iron out of operative relation with the book back; and, responsive to movement of the backing iron into operative relation with the book back, adjusting the spacing of said pivot points in accordance with a preselected value of the radius of the arc of oscillation.

24. An apparatus for backing, comprising a backing element, means for feeding a book toward an operating path of said backing element for engagement of the book back with the backing element to form the book back, a movable support for said backing element, and means mounting said support for oscillatable movement through a substantially circular arc, said means being adjustable to vary the radius of said arc.

25. An apparatus for backing and rounding books, comprising a backing element, means for feeding a book toward an operating path of said backing element for engagement of the book back with the backing element to form the book back, said feeding means being engageable with the sides of said book and feeding said book in a manner to cause a rounding of the back thereof, a movable support for said backing element, and means mounting said support for oscillatable movement through a substantially circular arc, said means being adjustable to vary the radius of said arc.

References Cited by the Examiner

UNITED STATES PATENTS

| 474,819 | 5/1892 | Crawley | 11—5 |
| 1,489,896 | 4/1924 | Murray | 11—5 |
| 1,959,656 | 5/1934 | Cahen | 11—5 |
| 2,010,810 | 8/1935 | Bredenberg | 11—5 |
| 2,911,659 | 11/1959 | Robbins et al. | 11—5 |

FOREIGN PATENTS

| 630,529 | 10/1949 | Great Britain. |

LAWRENCE CHARLES, *Primary Examiner.*